Figure 1:
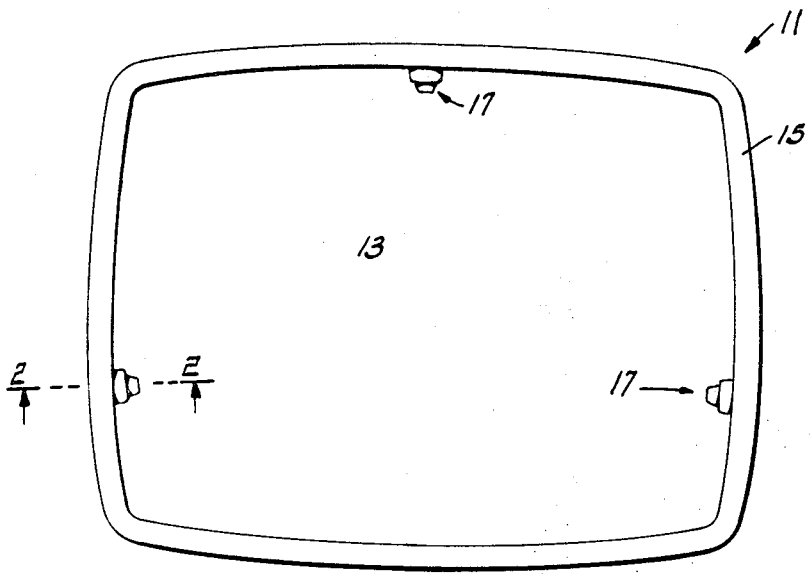

April 23, 1968     T. E. GANNOE     3,379,913
CRT FACE PANEL HAVING ARTICLE SUPPORTING STUDS THEREIN
Filed June 6, 1966

INVENTOR.
Thomas E. Gannoe
BY
ATTORNEY

United States Patent Office 3,379,913
Patented Apr. 23, 1968

3,379,913
CRT FACE PANEL HAVING ARTICLE SUPPORTING STUDS THEREIN
Thomas Earl Gannoe, Warren, Pa., assignor to Sylvania Electric Products Inc., a corporation of Delaware
Filed June 6, 1966, Ser. No. 555,339
3 Claims. (Cl. 313—85)

This invention relates to cathode ray tubes and more particularly to face panels thereof having article supporting studs retained therein.

In certain types of cathode ray tubes, particularly those adapted to provide color imagery, it is conventional to position specialized structures, such as grids or apertured shadow masks, in the proximity of the cathodoluminescent screen. These structures are usually supported within the face panel of the tube on a plurality of articles supporting studs embedded in the wall of the panel. The studs, which are heated for sealing embedment in the panel wall, are of an alloy having a thermal expansion coefficient compatible with that of the panel glass material. Their usual form is a plurality hollowed object comprising head, shoulder, and skirt portions, whereof the skirt is the portion embedded in the glass wall of the panel. The forming of the stud is conventionally accomplished by expensive machining or turning operations which shape the exterior and partially hollow the interior portions thereof. The external configuration and the limitations of internal machining produces a stud structure in which the several portions have differing masses and material thicknesses which produce uneven heat dissipation during the sealing operation. For example, in the skirt portion there is a marked increase in thickness from its extreme edge to the shoulder portion. This forms a considerable mass of material which, in addition to that of the head and shoulder portions, must be heated before the skirt portion is of a sufficient temperature suitable for insertion into the glass wall. In addition to a time requirement, the need for greater heat input to the head and shoulder portions aggravates the mismatch between materials. The mass of the shoulder portion does not allow flexural stress release of the skirt portion during sealing. Heat applied to the stud softens the glass during insertion, and since the stud is partially hollow the bubble of air trapped within the stud expands somewhat and shapes the glass adjacent thereto in a concave manner with a layer of glass extending substantially to the inner shoulder portion of the stud. The glass form of the seal in addition to the aforementioned uneven heat dissipation caused by the vast differences in mass and thickness of the stud material greatly increases the criticality of the sealing operation.

Accordingly, it is an object of the invention to reduce the aforementioned disadvantages and to improve the fabrication of cathode ray tube face panels having article supporting studs therein.

A further object is to provide a panel having article supporting studs therein formed to have substantially uniform heat dissipation.

Still other objects are to provide a panel having inexpensively fabricated studs therein which are formed to provide facile insertion and improved bonding in the panel sidewall.

The foregoing objects are achieved in one aspect of the invention by the provision of a cathode ray tube face panel having a plurality of improved article supporting studs suitably embedded in the wall thereof. Each of the respective supporting studs is comprised of head, shoulder and skirt portions. The head and shoulder portions are of substantially uniform material thickness, while the skirt portion has a differential thickness which decreases from the shoulder portion to the extremital edge portion therearound. The embedment of the skirt portion of the stud in the panel sidewall is facilitated by the distribution of the material mass of the stud which promotes rapid and uniform heating thereof.

Figure 2:
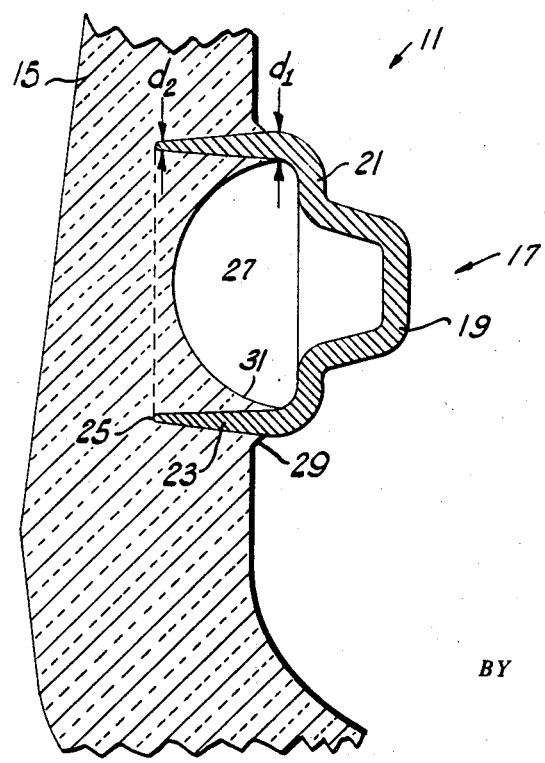

For a better understanding of the present invention, together with other and further objects, advantages, and capabilities thereof, reference is made to the following specification and appended claims in connection with the accompanying drawings in which:

FIGURE 1 is a plan view showing a cathode ray tube face panel with article supporting studs embedded in the wall thereof; and FIGURE 2 is a sectional view of the panel along the line 2—2 of FIGURE 1 showing the invention.

With reference to FIGURE 1, there is shown a plan view looking into the open side of a cathode ray tube face panel 11 before the cathodoluminescent screen is disposed on the viewing surface portion 13 thereof. Integrally surrounding the viewing surface portion is a substantially upstanding wall portion 15 having a spaced plurality of article supporting studs 17 discretely embedded therein. Although not shown, these studs are subsequently utilized to support a grid of apertured shadow mask in spaced relationship with the aforementioned subsequently formed cathodoluminescent screen.

In greater detail, reference is made to FIGURE 2 which is a sectional view of the panel wall taken along the line 2—2 of FIGURE 1 showing the constructional features of the improved stud embedded therein. This metallic stud is comprised of integral parts such as a head portion 19, a transition or shoulder portion 21, and a skirt portion 23. Improvement in the stud is evidenced internally by a substantial uniformity of material thickness in the head portion 19 and shoulder portion 21 which extends in a circumferentially expanding manner from the periphery of the base of the head portion. The skirt portion 23 integrally extending in a substantially perpendicular circumferential manner from the periphery of the shoulder or transition portion 21 exhibits a decrease in material thickness from that of the shoulder portion to an extremital edge portion 25 therearound.

The forming of the improved stud is expeditiously achieved from flat material by multiple stations in a drawing or forming process which eliminates the inherent disadvantages and costs of the prior art machining fabrication.

Prior to sealing embedment of the stud in the panel wall, surface of the stud is normally pre-oxidized to obtain a uniform mechanically strong seal or bond between the metal surface of the stud and the glass of the panel.

The sealing of the oxidized stud into the panel wall portion 15 is usually accomplished by applying heat to the stud, such as by R.F. induction means not shown, and inserting the heated skirt portion 23 thereof into the panel wall while the panel glass is maintained at a temperature above the strain point thereof. This discrete embedment and orientation is effected by cooperating fixtures not shown. Since identical values of glass and metal thermal expansion are not fully realized over the entire temperature range to which the seal is exposed, it is possible by proper selection of materials to keep the mismatch of expansivity to a minimum over a given temperature range.

It has been found that glass suitable for panels is that known as potash soda barium which is obtainable from the Corning Glass Works, Corning, New York, as Corning glass code types 9010 and 9019, the latter being the harder of the glasses mentioned. Stud materials having thermal expansion characteristics suitable to consummate a glass-to-metal seal with the above-identified glasses may be alloys listed by AISI (American Iron and Steel Institute) designations such as Number 4 Alloy, which is a nickel-chrome-iron material available from Sylvania Electric Products, Inc., Warren, Pa.; and 430 Ti stainless steel which is a chrome-iron alloy produced by Allegheny Ludlum Steel Corp., Pittsurgh, Pa.

The material thickness, by way of example, may be .040″ strip or sheet, which in the skirt portion is gradually decreased from a $d_1$ width at the shoulder portion to a $d_2$ width at the extremital edge 25, which, for example, may be .010″. Thus, a ratio of $d_1/d_2$ would, in this example, be 4.0. It has been found that a ratio less than 4.5 is beneficially desirable for sealing in glass. The $d_1/d_2$ ratio of the formerly used machined stud is considerably greater.

In the improved stud structure, the uniformity of material in the shoulder portion 21 and the gradual decrease therefrom in the skirt portion 23 provides for flexure release of stresses set up during sealing. This allows for a wider variation in sealing process temperature than was possible with the formerly utilized stud. Additionally, the uniformity of mass and thickness promotes rapidity and uniformity of heating. Because of less mass in the stud, less input heat is required to raise the skirt portion to the desired temperature for insertion; thus, the mismatch between materials is lessened which promotes better sealing therebetween. The relative thinness of the skirt 23 provides for improved ease and rapidity of insertion into the glass of the panel wall.

To prevent the formation of undesirable re-entrant angles between the glass and metal materials, a slight retraction of the stud, while the glass contiguous thereto is still plastic, forms an external build-up or bead of glass 29 around the periphery of the skirt and an internal taper of glass 31 adjacent the skirt and shoulder portion thereof.

The formation of the improved stud provides a hollow therein that is larger than that in the machined stud. The larger hollow forms a larger air bubble, 27 which, in turn, promotes a thinner internal taper of glass 31 to provide improved sealing with the thinner skirt.

Thus, by utilizing the improved stud there is provided an improved cathode ray tube face panel. Since the improved studs have substantially uniform heat dissipation, improved sealing or bonding with the panel glass is achieved. Substantially uniform material thickness of the studs permits stress release by flexure between substantially the shoulder and skirt portions, promotes rapid and uniform heating, and enables facile insertion into the glass. The resultant panel has studding seals therein heretofore unattained. In addition, the desired structure of the improved stud lends itself to inexpensive means of fabrication that produces repetitive uniformity of structure.

While there has been shown and described what is at present considered the preferred embodiment of the invention, it will be obvious to those skilled in the art that various changes and modifications may be made therein without departing from the scope of the invention as defined by the appended claims.

What is claimed is:

1. A cathode ray tube face panel having a substantially upstanding wall therearound with a spaced plurality of article supporting studs retained therein, said studs comprising:

a head portion of substantially uniform material thickness;

a transition portion integrally extending from the periphery of the base of said head portion having a substantially uniform material thickness substantially equalling that of said head portion; and a skirt portion integrally extending from said transition portion, said skirt portion having a decrease in material thickness from said transition portion to an extremital edge portion therearound, said skirt portion being attached to said panel wall portion by sealed embedment therein.

2. A cathode ray tube face panel according to claim 1 wherein said transition portion is in the form of a shoulder portion integrally extending in an expanding manner from the periphery of the base of said head portion and having a substantially uniform material thickness substantially equalling that of said head portion, said skirt portion integrally extending in a substantially perpendicular circumferential manner from the periphery of said shoulder portion.

3. A cathode ray tube face panel according to claim 1 wherein said skirt of said stud has a $d_1$ material thickness at substantially said transition portion thereof and a $d_2$ material thickness at substantially said extremital edge with the ratio $d_1/d_2$ being less than 4.5.

References Cited

UNITED STATES PATENTS 3,004,182 10/1961 Pfaender _____ 313—64
3,021,643 2/1963 Blanding et al.

MARTHA L. RICE, *Primary Examiner.*

UNITED STATES PATENT OFFICE
CERTIFICATE OF CORRECTION

Patent No. 3,379,913                  April 23, 1968

Thomas Earl Gannoe

It is certified that error appears in the above identified patent and that said Letters Patent are hereby corrected as shown below:

Column 1, line 22, "plurality" should read -- partially --; lines 33 and 34, "extreme" should read -- extremital --. Column 2, line 24, "of" should read -- or --.

Signed and sealed this 2nd day of September 1969.

(SEAL)
Attest:

Edward M. Fletcher, Jr.                WILLIAM E. SCHUYLER, JR.
Attesting Officer                         Commissioner of Patents